C. L. RAYFIELD.
BELT TIGHTENER.
APPLICATION FILED MAR. 19, 1918.
1,348,183.
Patented Aug. 3, 1920.
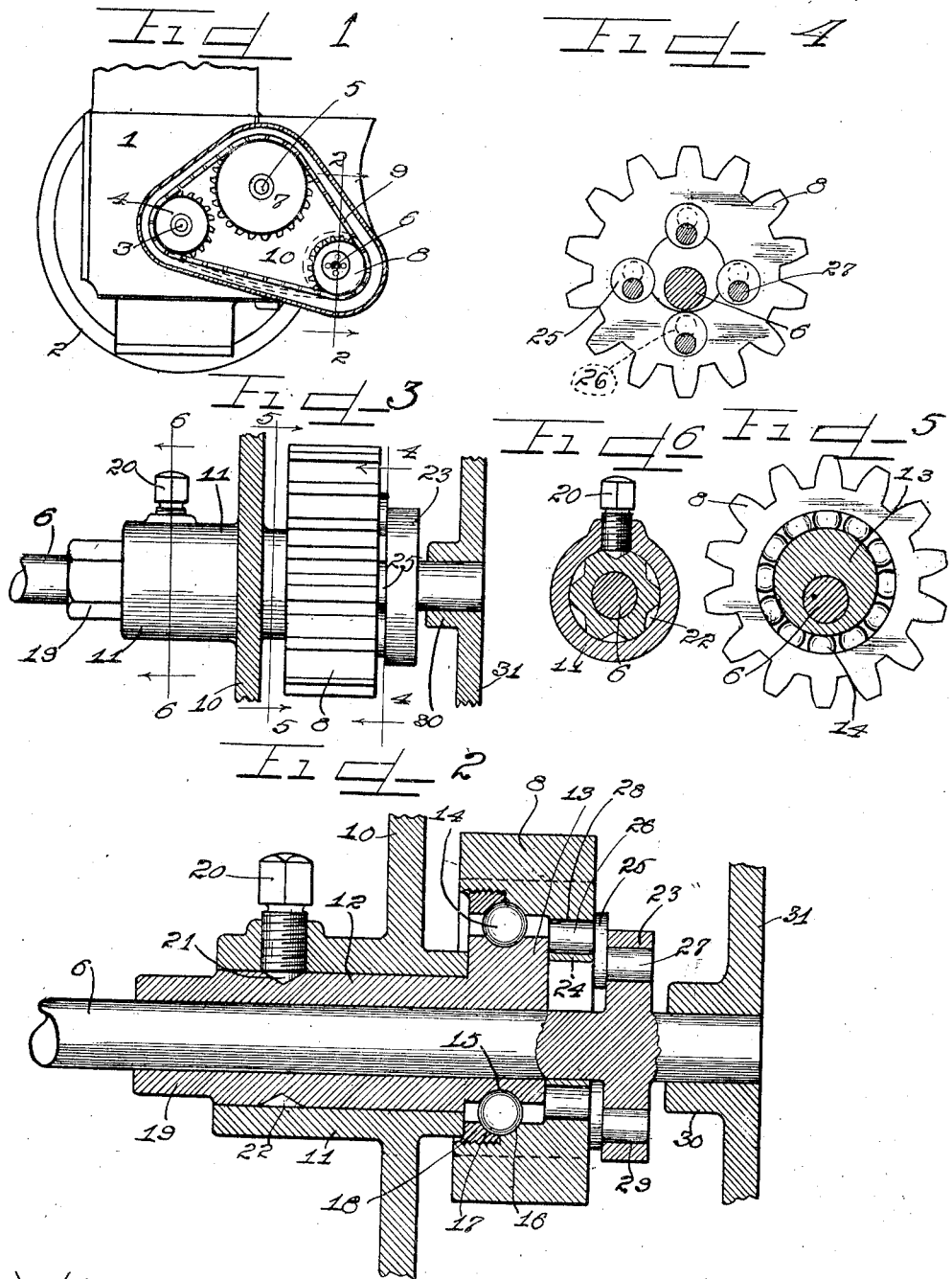

UNITED STATES PATENT OFFICE.

CHARLES L. RAYFIELD, OF CHICAGO, ILLINOIS.

BELT-TIGHTENER.

1,348,183.     Specification of Letters Patent.     Patented Aug. 3, 1920.

Application filed March 19, 1918. Serial No. 223,257.

*To all whom it may concern:*

Be it known that I, CHARLES L. RAYFIELD, a citizen of the United States, and a resident of the city of Chicago, in the county of Cook and State of Illinois, have invented certain new and useful Improvements in Belt-Tighteners; and I do hereby declare that the following is a full, clear, and exact description of the same, reference being had to the accompanying drawings and to the numerals of reference marked thereon, which form a part of this specification.

This invention relates to belt tighteners, and has for its object to provide a modified construction over that disclosed in companion application, filed by me of even date herewith, Serial No. 223,258, as hereinafter more definitely will be pointed out and claimed, reference being had to the accompanying drawing, in which:

Figure 1 is an end view of a portion of an engine showing the gear case cover removed and my invention applied thereto.

Fig. 2 is an enlarged sectional view of the chain tightener parts taken on the line 2—2 of Fig. 1.

Fig. 3 is a side elevation of the parts shown in Fig. 2, somewhat reduced.

Fig. 4 is a view on the line 4—4 of Fig. 3.

Fig. 5 is a view on the line 5—5 of Fig. 3.

Fig. 6 is a sectional view on the line 6—6 of Fig. 3.

As shown on the drawings:

For the sake of illustration, and because it is particularly adapted for such use, I have shown my invention as applied to an automobile engine although I do not limit myself to such use.

The reference numeral 1, indicates the crank case of an ordinary gasolene engine and 2, the fly-wheel which is mounted on the crank shaft 3. At one end of the crank case, there is usually provided a gear chamber or case in which is a gear or sprocket wheel 4, which drives the cam shaft 5, which operates the valves, and there is usually a magneto or pump shaft 6, which is also driven from the shaft 3. The shafts 5 and 6, are usually provided with link belt gears 7 and 8, which are driven by means of the link belt 9, from the gear wheel 4, on the crank shaft 3, and heretofore it has been found somewhat difficult to provide for adjustment to take up the slack in the chain 9, due to ordinary wear, and it is for the purpose of making such adjustment where the relative position of the shafts must remain the same that this invention is designed.

This invention may be applied to any of the shafts 3, 5 or 6, but as the shaft 6, is usually smaller and more convenient for access, the belt tightener is preferably applied to this shaft.

This shaft 6, is mounted in bearings so as to have the desired fixed relation with reference to the shaft 3 and 5, and other parts of the engine, one of which bearings is in the inner wall 10, of the case and indicated at 11. This bearing 11, has the sleeve 12, mounted to turn therein, and this sleeve 12, in turn provides the bearing for the shaft 6, so that the shaft 6, is concentric therewith and turns freely therein. At one end of the bearing 11, the sleeve 12, is provide with a disk 13, which is mounted thereon eccentrically of the sleeve 12, and also eccentrically of the shaft 6. The gear 8, for driving the shaft 6, is mounted to turn on the disk 13, and may be mounted directly thereon or by means of ball bearings 14, as shown in Fig. 2. In this latter construction, the disk 13, is provided with a ball race 15, on the outer face thereof, and the gear 8, with a corresponding ball race formed partially at 16, on the interior of the gear 8, and partially at 17, on the inner end of a ring 18, threaded into the interior of the gear 8, to complete the ball race and hold the gear 8, securely on the disk 13.

The sleeve 12, is provided at the end opposite the disk 13, with a nut extension 19, whereby the sleeve 12, may be turned for adjusting the position of the eccentric disk 13, and this sleeve may be held in the position of adjustment by means of a set screw 20, which is threaded through an opening in the bearing 11, and has the inner tapered end 21, thereof, adapted to engage conical depressions 22, in the surface of the sleeve 12. This construction holds the sleeve and the eccentric disk 13, stationary in the adjusted position and the gear 8, rotates on the eccentric disk 13.

For driving the shaft 6, from the gear 13, the shaft 6, is provided with, or enlarged to form a plate or disk 23, beyond the gear 8, and the gear 8, has an inturned flange 24, extending over the end of the disk 13. Connecting the flange 24, with the disk 23, are a plurality of crank members, each composed of a disk 25, having the pins 26 and 27, eccentrically arranged on the opposite faces of the disk 25, so as to engage the bearings 28, for the said pins in the flange 24, and the bearings 29, for the said pins in the plate 23.

The shaft 6, is extended beyond the plate 23, and the extended end thereof journaled in a bearing 30, provided therefor in the cover plate 31, on the gear case.

The operation is as follows:

Assuming that the shaft 3, is being rotated, power will be communicated therefrom through the chain 9, to the gear 8, on the shaft 6, and the gear 8, will be caused to rotate on the stationary disk 13. The disk 23, being connected with the gear 8, by means of the crank disks 25, is caused to turn simultaneously with the gear 8, and as the pins 26, are carried around by the gear 8, from a point distant from the axis of the shaft 6, to a point nearer to the axis of the shaft 6, the crank disk 25, is caused to turn so as to adjust itself to the constantly changing position of the pins 26.

It will be seen therefore that a connection exists between the gear 8, and the disk 23, which compels turning of the disk 23, simultaneously with the gear 8, and at the same time provides for a pivotal connection between the gear 8, and the disk 23, which permits the turning of the gear 8, on a different axis than the shaft 6.

When the parts are originally connected up, the gear 8, will be positioned eccentrically of the shaft 6, toward the gear 4, from which it receives its power, such position being shown by the dotted lines in Fig. 1. As the chain becomes loose under wear, the set screw 20, is loosened and the sleeve 12, turned by means of a wrench applied to the nut 19, so as to swing the gear 8, outwardly around the shaft 6, which movement takes up the slack in the chain 9, without varying the location of the shaft 6. It is preferred that the amount of adjustment which may be obtained by swinging the gear 8, from the inner to the outer position shall be approximately the amount of one link in the chain 9, so that after the gear 8, has swung to the outward position, and it becomes necessary to further tighten the chain 9, the gear 8, will be swung to the inward position and a link removed from the chain, after which the chain may be tightened as previously explained.

I have shown my invention as applied to an engine and used for tightening a chain or belt. However, it may be used in other constructions in which it is desired to tighten or loosen a belt without varying the relative position of the axes of the driving and driven members and it may also be employed for adjusting the relation of gears so that they may be made to mesh properly without adjusting the relative position of their shafts.

I am aware that the details of construction may be varied through a wide range without departing from the principles of the invention. I therefore do not purpose limiting the patent granted otherwise than necessitated by the prior art.

I claim as my invention:

1. The combination of a rotary shaft, an eccentric adjustable rotatably thereon, a rotary member journaled on the eccentric and having a series of circular apertures circularly arranged in a lateral face thereof, a disk secured to said shaft and rotatable therewith and having a corresponding series of circular apertures circularly arranged in a lateral face thereof, and connecting members comprising a central portion and pins integral therewith extending laterally on each side thereof adapted to engage said apertures, said pins being offset relatively to each other to allow for the eccentric mounting of said rotary member.

2. The combination of a rotary shaft, an eccentric adjustable rotatably thereon, a rotary member journaled on the eccentric having an inwardly directed flange extending across one face of the eccentric, said flange having a series of circular apertures circularly arranged in a lateral face thereof, a disk secured to said shaft and rotatable therewith and having a corresponding series of circular apertures circularly arranged in a lateral face thereof, and connecting members each comprising a central portion and pins integral therewith extending laterally on each side thereof and adapted to engage said apertures, said pins being offset relatively to each other to allow for the eccentric mounting of said rotary member.

In testimony whereof I have hereunto subscribed my name in the presence of two subscribing witnesses.

CHARLES L. RAYFIELD.

Witnesses:
 CHARLES W. HILLS, Jr.,
 FRED E. PAESLER.